Figure 1:
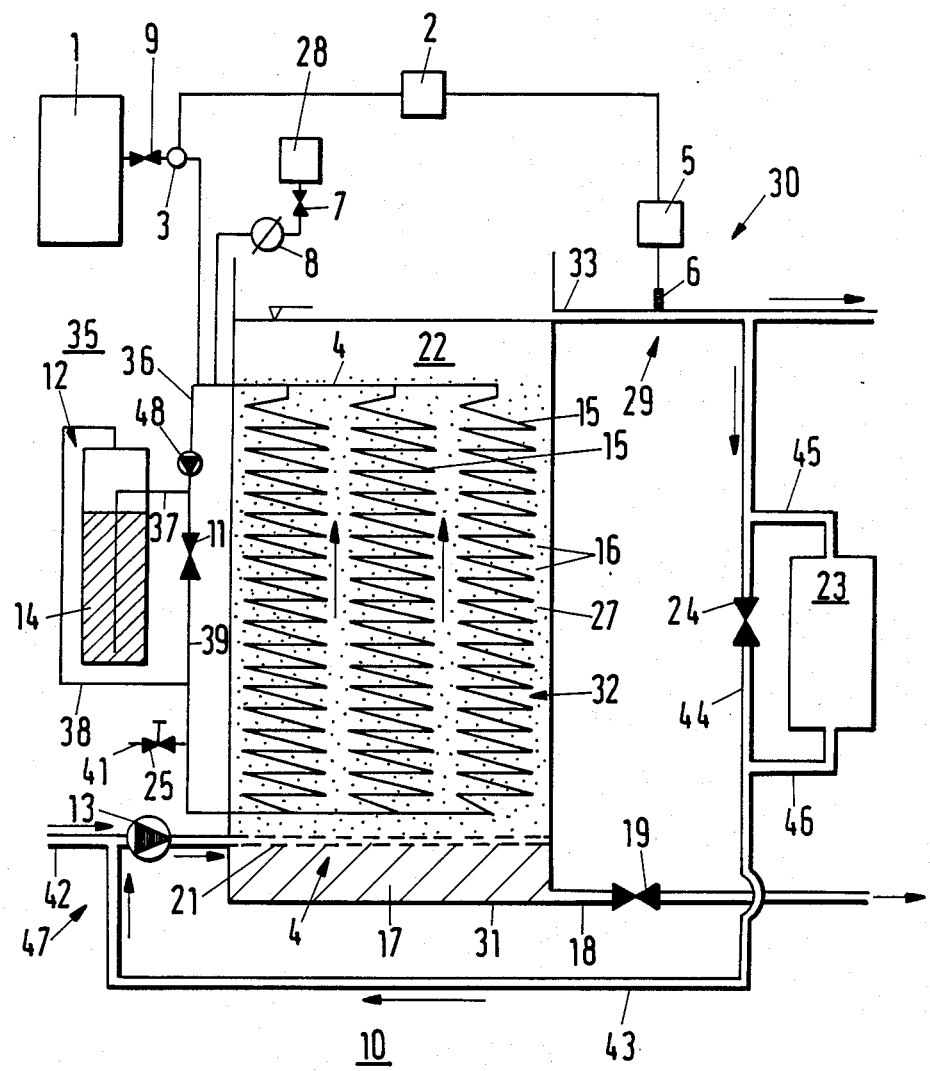

[19] United States Patent
Sekoulov et al.

[11] Patent Number: 4,883,594
[45] Date of Patent: Nov. 28, 1989

[54] FLOODED BIOLOGICAL FILM REACTOR FOR WATER TREATMENT, WITH GAS CHARGING VIA A MEMBRANE

[76] Inventors: Ivan Sekoulov, Muellenhoffweg 22, DE-2000 Hamburg 52; Hans-Juergen Braeutigam, Marmstorfer Weg 74, D-2100 Hamburg 90, both of Fed. Rep. of Germany

[21] Appl. No.: 26,693
[22] PCT Filed: Jul. 17, 1986
[86] PCT No.: PCT/EP86/00419
   § 371 Date: May 4, 1987
   § 102(e) Date: May 4, 1987
[87] PCT Pub. No.: WO87/00517
   PCT Pub. Date: Jan. 29, 1987

[30] Foreign Application Priority Data
   Jul. 17, 1985 [DE] Fed. Rep. of Germany ....... 3525493
   Dec. 14, 1985 [DE] Fed. Rep. of Germany ....... 3544383

[51] Int. Cl.$^4$ ................................................ C02F 3/06
[52] U.S. Cl. ..................................... 210/603; 210/617; 210/622
[58] Field of Search .................... 210/603, 615–618, 210/150, 151, 621, 622, 629

[56] References Cited

U.S. PATENT DOCUMENTS

| | | | |
|---|---|---|---|
| 4,009,098 | 2/1977 | Jeris | 210/618 |
| 4,181,604 | 1/1980 | Onishi et al. | 210/150 X |
| 4,182,675 | 1/1980 | Jeris | 210/618 X |
| 4,321,141 | 3/1982 | Messing | 210/603 |
| 4,416,993 | 11/1983 | McKeown | 210/151 X |
| 4,622,148 | 11/1986 | Willinger | 210/615 |

FOREIGN PATENT DOCUMENTS

| | | |
|---|---|---|
| 0067116 | 12/1982 | European Pat. Off. |
| 1459450 | 1/1969 | Fed. Rep. of Germany |
| 3129064 | 2/1983 | Fed. Rep. of Germany |
| 2026079 | 3/1971 | United Kingdom |
| 2025256 | 1/1980 | United Kingdom |
| 2075547 | 11/1981 | United Kingdom |

Primary Examiner—Tom Wyse
Attorney, Agent, or Firm—Sixbey, Friedman, Leedom & Ferguson

[57] ABSTRACT

The support material (27) in the reactor is uniformly subjected, over the height of the reactor bed, to a gas flow ensuring supply and evacuation. The biological film reactor (22) can be fed with oxygen, hydrogen and/or carbon dioxide. The reactor (22) is in the form of a fluidized bed and has an inlet (42) near the floor of the reactor and an outlet (33) near the top. Located in the fluidized bed (32) between a distribution network (4) for the inlet water and the outlet (33) is a material exchanger (15) consisting of a support frame (20) on which is fitted a thin-walled pipe (26) of roughly helicoidal shape, made of non-porous plastic and having its turns (34) spaced at intervals. The pipe is connected to a gas supply device (35). An absorber (12) can be connected to the gas supply line (36). Furthermore, between the outlet (33) and the inlet (42) it is possible to fit a recirculation line (43) with an additional material exchanger (23) in which a gas is fed to the recycling water via exchange surfaces consisting of a non-porous plastic.

3 Claims, 5 Drawing Sheets

FLOODED BIOLOGICAL FILM REACTOR FOR WATER TREATMENT, WITH GAS CHARGING VIA A MEMBRANE

The invention relates to a process for biological and/or physical elimination of unwished water components from water by means of flooded biofilm reactors and a plant for application of the process.

More particularly, the process and the plant is for purification of water contaminated with unwished inorganic compounds like ammonium, nitrate and nitrite, and toxic volatile hydrocarbons like halogenated hydrocarbons or for example ammonia containing compounds respectively. It is known that biofilm reactors have advantages compared with thoroughly mixed reactors concerning slow growing microorganisms like nitrifying bacteria. For example, microorganisms grown on the support material remain in the system and are enriched additionally. The problem of biofilm reactors is to supply oxygen or other gases like hydrogen to biofilm microorganisms and to eliminate the metabolic end products carbon dioxide and nitrogen in case of denitrification. Further, concentration gradients are formed in biofilm reactors from the reactor inlet towards the reactor outlet, decreasing performance. The enlargement of inner surface of a biofilm reactor by means of a support material with large specific surface (for example $O_s \geqq 250$ m$^2$/m$^3$) can increase the biomass production and the turnover essentially. With fixed bed reactors the hydraulic flow, indeed, can be affected. This problem does not exist using fluidized bed reactors. Therefore they were tried for a long time for water purification. The realization of a 15 to 20% bed expansion in a technical scale has turned out, indeed, as problematic, because the fluidized bed got uncontrolled after direct aeration of the reactor for support of microbial growth. The air injection at the bottom of the fluidized bed reactor for covering the oxygen requirement has also turned out as disadvantage, because bubbling up gas is continuosly expelling support material and therefore complicating continuous operation. For this reason the external enrichment with oxygen became important. The oxygen concentration of supplied water is increased to values of approximately 50 g $O_2$/m$^3$ before introduced into fluidized bed, using pure oxygen at overpressure in an oxygen generator. A characteristic feature of this process is a significant decrease of oxygen concentration, corresponding to the height of fluidized bed. Possible impairments of biological turnover process can only be prevented by high recirculation rates, what also is thought to be disadvantageous.

The problem of the invention is to provide a process and a plant for application of the process, where gases for water purification are introduced into the biofilm reactor in such a way that no obstruction of the reactor or inhibition of microbial growth does occur.

According to the invention this problem is solved in that the reactor support material all over the height of the reactor's bed is constantly admitted with a gas for gas supply or gas removal. A fluidized bed reactor is used as a biofilm reactor where a substance exchanger made of non-porous synthetics is inserted. A bubble free gas introduction into the biofilm reactor is achieved by this substance exchanger, so that e.g. oxygen supply for the entire microbial population is achieved to fluidized bed support material. If required, the gases in recirculated water stream can be concentrated by means of a further gas exchanger of non-porous synthetics. Unwished flotations, caused by metabolic end products carbon dioxide and respectively nitrogen from denitrification are prevented by simultaneous removal by means of a substance exchanger, deviating a partial gas stream or placing an appropriate absorber unit into the gas cycle. Other volatile substances like e.g. low molecular halogenated hydrocarbon compounds or other organic compounds are eliminated continuously from the gaseous phase and thus from the water by activated carbon in the absorber. Therefore the substance exchanger(s) simultaneously are for gas supply and gas removal. The special and uniform gas supply in the whole reactor bed covers, in relation to fluidized bed volume, the high oxygen requirement in fluidized bed reactors, showing a very large biological active surface because of the small particle size of support material and the floating condition.

Further features of the invention are described in the subclaims.

Figure 2A:
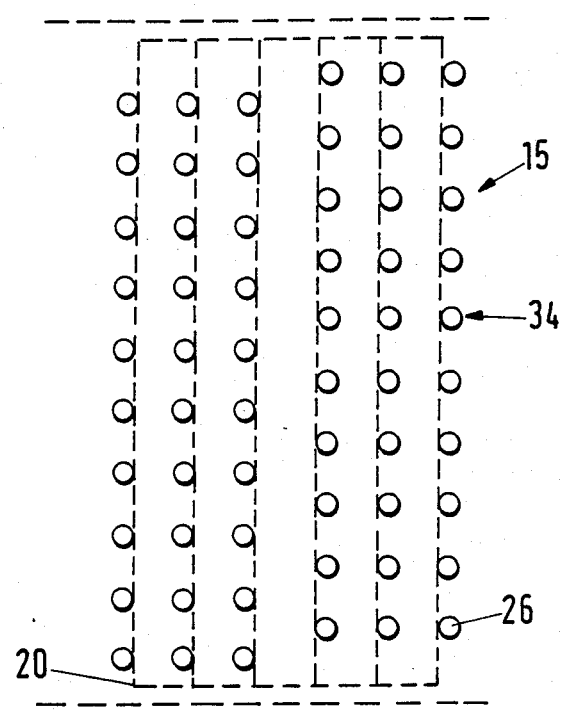
Figure 2B:
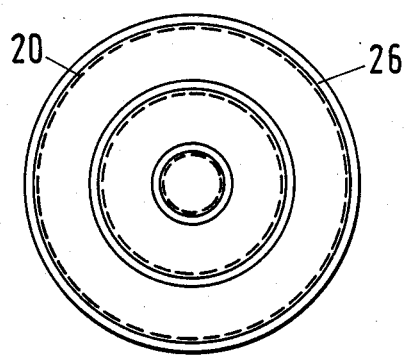
Figure 3:
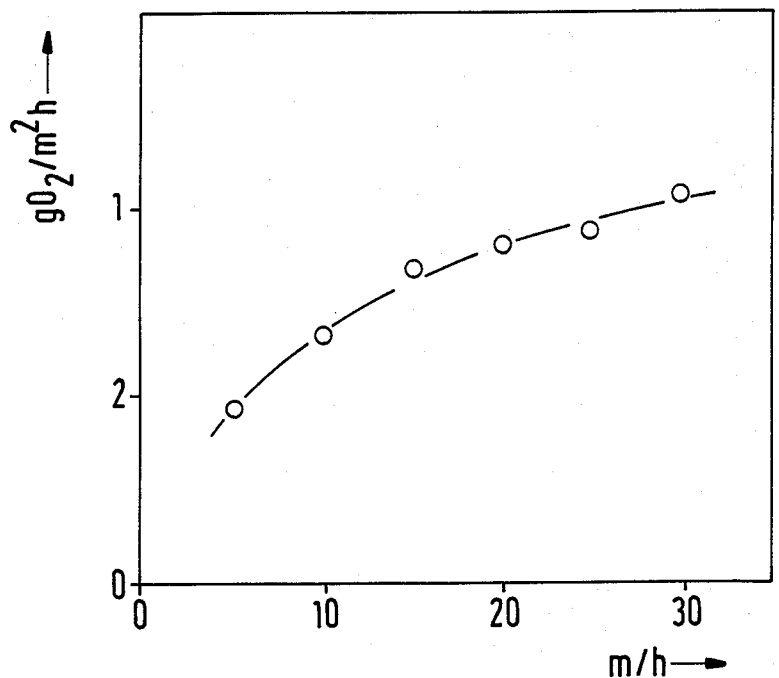
Figure 4:
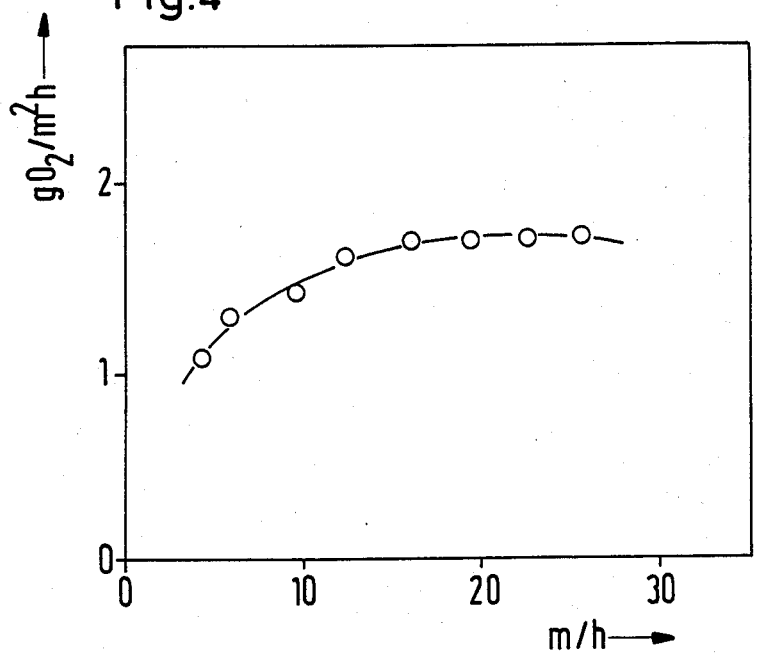
Figure 5A:
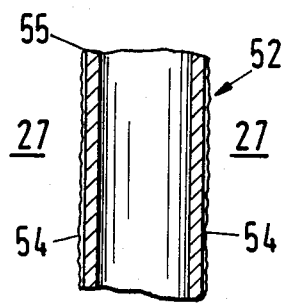
Figure 5B:
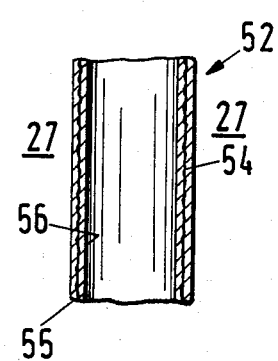
Figure 5C:
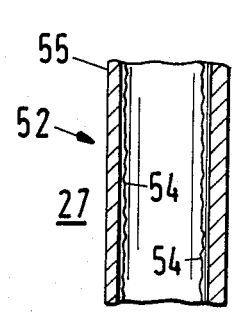
Figure 5D:
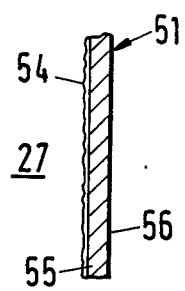
Figure 5E:
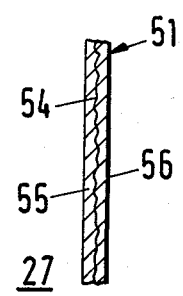
Figure 5F:
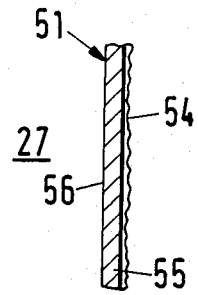
Figure 6A:
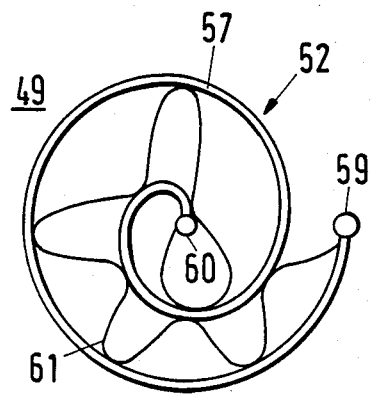
Figure 6B:
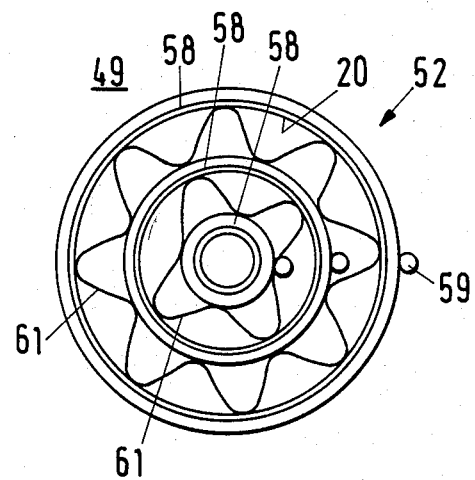
Figure 7A:
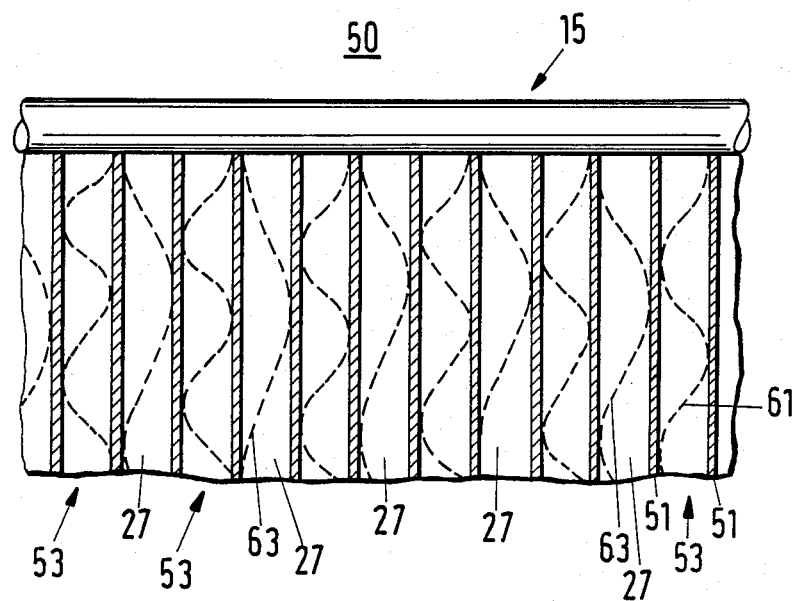
Figure 7B:
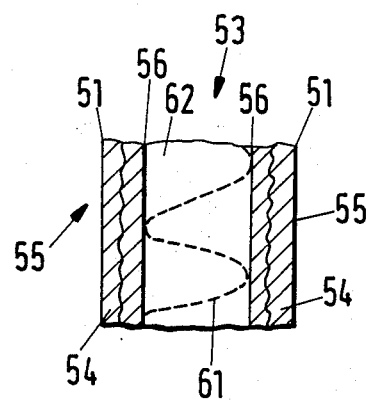

A plant is shown in the drawings for application of the process according to the invention. It shows:

FIG. 1 a plant with a fluidized bed reactor in a diagrammatic representation,

FIG. 2a and 2b a substance exchanger for fluidized bed reactor in a diagrammatic side view and a top view, FIG. 3 and 4 the relation between oxygen input and flow rate in a fixed bed reactor and a fluidized bed reactor in a graphical representation, FIG. 5a to 5f different types of special synthetics membranes for the substance exchanger, FIG. 6a and 6b the arrangement of tube membranes for the substance exchanger in a diagrammatic top view, FIG. 7a a further type of substance exchanger in a diagrammtic side view, FIG. 7b a double membrane in an enlarged detail view.

Plant 10 for biological and/or physical elimination of unwished water components from water consists of a biofilm reactor 22, provided as a fluidized bed reactor, a device for gas supply 35 and a device for water supply 47. A bottom drain 18 as well as a distribution system 4 is arranged at the bottom of the case of biofilm reactor 22. The distribution system 4 e.g. can consist of perforated tubes 21. A bottom drainage 17 is arranged between distribution system 4 and bottom drain 18. The fluidized bed 32 is above bottom drainage 17, consisting of reactor support material 27, e.g. fine grained pumice stone or sand. The grain diameter of reactor support material 27 may be for example 0.4 mm. A substance exchanger 15 is arranged in fluidized bed 32, consisting of a helical twisted thinwalled tube 26 of non-porous synthetics arranged at a supporting frame 20. The tube windings 34 are arranged separately, to achieve the most practicable gas exchange for the reactor support material 27 (FIG. 2a and 2b).

The substance exchanger 15 can also be provided as a membrane module 49, 50 and therefore as an interchangeable constructional element, showing non-porous synthetic membranes 51, 52, 53. These can be reinforced by textile 54. FIG. 5a to 5c show synthetic membranes 52 provided as tube membranes, consisting of silicon material known in the art, e.g. silicon caoutchouc or synthetics, coated with silicon or silicon caoutchouc. The textile 54 can be embedded in synthetic membrane 52, or arranged on the surface 55 adjacent to the reactor support material 27, or arranged on the surface 56 opponent to reactor support material 27. Textile 54 can consist of monofil or multifil organic or inorganic fibers. Organic fibers can be e.g. polyester, polyamide, teflon fibers, while glass fibers or metal fibers are used as inorganic fibers. Resistance to temperatures for sterilization without impairment of mechanical qualities is a special advantage of fibers, e.g. made of polyester. In FIG. 5d to 5f non-porous synthetic membranes are also shown, constructed as flat membranes. These synthetic membranes 51 also show reinforcements of textile 54, provided and arranged as described above. Of course, it will be recognized that, in the context of the present invention, the term nonporous is used in its definitional sense of impermeable to liquids.

FIG. 6a and 6b shows an arrangement of non-porous synthetic membranes 52 provided as tube membranes of membrane module 49 in a top view. The tube membranes can be provided helically as a spiral ring 57 (FIG. 6a) in a horizontal level, with a spreader 61, arranged in the spiral ring 57 e.g. at corrugated band or textile. At the end sections connecting conduits 59, 60 are provided, arranged in supporting frame 20 and connected to gas feed conduit 36 and gas reflux conduit 40. A membrane module 47 with tube membranes provided as circular ring 58, concentrically arranged in a horizontal level, is shown in FIG. 6b. Each circular ring 58 has a connecting conduit 59 connected to gas feed conduit 36 and gas backflow conduit 40. It is also possible to arrange as spreader 61 e.g. a corrugated band or textile between two circular rings 58.

In FIG. 7a a membrane module 50 is shown, provided as substance exchanger 15 with synthetic membranes 53, vertically arranged. Instead of synthetic membranes 53, synthetic membranes 52 can also be used. The synthetic membranes 53 are provided as double membranes, consisting of two synthetic membranes 51 separated by means of spreader 61 (FIG. 7b). This can be a corrugated band. Gas is fed through canal 62 of double membrane and diffuses outwards through the synthetic membranes 51 into the water phase, and then to reactor support material 27. Synthetic membranes 53, separated by spreaders 63, are connected at end sections to gas feed conduit 36 and gas backflow conduit 40 by means of connecting conduits.

The improvement of mechanical stability of synthetic membranes 51, 52, 53 obtained by textile reinforcement results in ease of operation to each membrane. The danger of mechanical damage always a consequence of unreinforced thinwalled and also tubular membranes, is mostly eliminated with reinforced membranes 51, 52, 53. Gas supply through non-porous synthetic membranes 51, 52, 53 with textile reinforcement is generally suitable for all reactor types used in biotechnology, and advantageous for realization of biotechnological reactions in fluidized fixed bed reactor with modular design like tube module, flat membrane module, spiral module with tubes or flat membranes, especially oriented to the field of application. In this case the microorganisms either form a biofilm on fine grained particles of e.g. 0.5 mm in diameter like e.g. sand, or form a bacterial pellet under permanent floating conditions without additional particles produced by going up stream of nutrient medium. If the synthetic membrane module is evenly penetrating the whole fluidized bed, the foam production is prevented and additionally a gentle gas supply distributed over the whole fluidized bed is achieved, increasing the activity of microorganisms.

Substance exchanger 15 is connected to device for gas supply 35 by means of connecting conduit. The device for gas supply 36 consists of gas reservoir 1, which can be closed by means of stop valve 9. Further, a pressure keeping valve 3 is provided, connected to controller 2, which is connected to measuring device 30. Measuring device 30 consists of transducer 5 and sensor 6, arranged in outlet 33 of biofilm reactor 22. Further, a pressure controller 8 and, by means of valve 7, a pressure gas holder 28 is connected to conduit for gas supply. Compressor 48 is arranged in gas feed conduit. Absorber 12, filled with absorbent or adsorbent 14 respectivly, is connected by means of connecting conduit 37, 38. Valve 11 is between connecting conduit 37, 38 in short circuit conduit 39. Further, outlet conduit 41 with valve 25 is connected to gas feed conduit 36.

A recirculation conduit 43 with substance exchanger 23 is arranged between outlet 33 and inlet 42 of biofilm reactor 22. In substance exchanger 23 gas can be supplied to recirculated water through exchange areas, consisting of non-porous synthetics. A short circuit conduit 44 with valve 24 is arranged between both connecting conduits 45, 46 of substance exchanger 23. Water is supplied into distribution system 4 by means of inlet pump 13. The water to be purified is injected through distribution system 4, e.g. consisting of perforated tubes 21 at the bottom 31 into biofilm reactor 22 by means of inlet pump 13 and is streaming up from below. As described above, biofilm reactor 22 shows a bottom drain 18 and a bottom drainage 17. Bottom drainage 17 retains the reactor support material 27 in biofilm reactor 22, when biofilm reactor is scoured after opening vale 19. in contact with the biofilm on the surface 16 of support material the biological reactions are running. Corresponding to the flow rate the reactor support material is static or expanding. Corresponding to the flow rate biofilm reactor 22 contains either a fixed bed or a fluidized bed.

Oxygen, required for aerobic processes, is supplied through the one or more substance exchanger 15. Other gases, e.g. methane or hydrogen and/or carbon dioxide for autotrophic denifitrication and also e.g. for drinking water treatment are also introduced through substance exchanger 15 into biofilm reactor 22 in this way.

Gas or gas mixture of the gas supply system is continuously or discontinuously injected into the substance exchanger 15 by means of automatic pressure keeping valve 3 under given limits as well as by means of stop valve 9. Valve 7 is used as safety gas outlet, controlled by pressure controller 8. If there is a partial pressure gradient for an agent between water and gaseous phase, substance exchanger 15 can additionally be used as removal system. For this the gas stream is transmitted through adsorber 12, filled with an appropriate absorbent or adsorbent like e.g. alkaline solution or activated carbon.

A further possibility to eliminate unwished gas components like e.g. carbon dioxide, nitrogen, or ammonia from water phase is a controlled deviation of a partial gas stream by means of controllable valve 25. Absorber 12 can also be passed by opening valve 11.

A constant oxygen concentration in reactors outlet 29 in the region of sensor 6 can be achieved by means of controller 2, controlling the oxygen partial pressure and taking measured values of transducer 5 as a basis.

The recirculation water can be enriched, if necessary, with gas by means of a further substance exchanger 23 of non-porous synthetics, connected to recirculation conduit 43. Simultaneously, metabolic products and interfering water components can be eliminated. In substance exchanger 23 synthetic flat membranes can also be installed.

FIGS. 3 and 4 show the process described hereinbefore for oxygen supply in a fixed bed reactor and a fluidized bed reactor. Pumice stone was used as a bed material for fixed bed reactors, showing a grade size of 1.5 to 3.0 mm. In fluidized bed reactor sand was used with a grade size of 0.1 to 0.3 mm. The substance exchanger used had a tube made of silicon caoutchouc. In both reactors the oxygen input increased in relation to the flow rate of the water phase.

In case of fixed bed reactor (FIG. 3) the oxygen input increases in relation of increase of flow rate (5 m/h to 30 m/h) from 0.9 g $O_2$ per hour and $m^2$ exchange area (g $O_2/m^2h$) to 2.0 $g/m^2.h$.

Increasing flow rate and increasing fluidized bed expansion is also resulting in an increase of oxygen input from 1.1 g $O_2/m^2h$ to 1.7 g $O_2/m^2h$ in fluidized bed reactor (FIG. 4). The fluidized bed expansion reaches the upper level of the exchanger at a flow rate of 16 m/h. An increase of flow rate beyond this rate does not increase oxygen input essentially.

In both cases, oxygen partial pressure was $P_{O2}=1.0$ bar. Oxygen input from the exchanger increases proportionally with oxygen partial pressure.

We claim:

1. Process for elimination of undesired water components from water by means of flooded biofilm reactors having a reactor bed with reactor support material, wherein water is supplied into the reactor via a distribution system and a gas is constantly admitted to the reactor support material over the full height of the whole reactor bed, wherein the admitted gas is a gas required by a biofilm on the reactor support material, is admitted to the reactor support material and released metabolic end products are withdrawn from the reactor support material by means of a first substance exchanger formed of a liquid impermeable synthetic material that is reinforced by a textile and surrounded by the reactor support material, wherein water is withdrawn from the biofilm reactor for recirculation and a gas from the group consisting of oxygen, hydrogen and carbon dioxide is supplied to the recirculation water through a second substance exchanger formed of a textile reinforced nonporous synthetic material and the recirculation water then returned to the biofilm reactor, and wherein undesired gas and volatile components are separated and removed from the reactor and passed through an absorber unit.

2. Process according to claim 1, wherein said reactor bed is utilized as a fluidized bed.

3. Process according to claim 1, wherein said reactor bed is utilized as a fixed bed.

* * * * *